May 12, 1936.  T. V. BUCKWALTER  2,040,803
BEARING LUBRICATION
Filed April 12, 1935  2 Sheets-Sheet 1
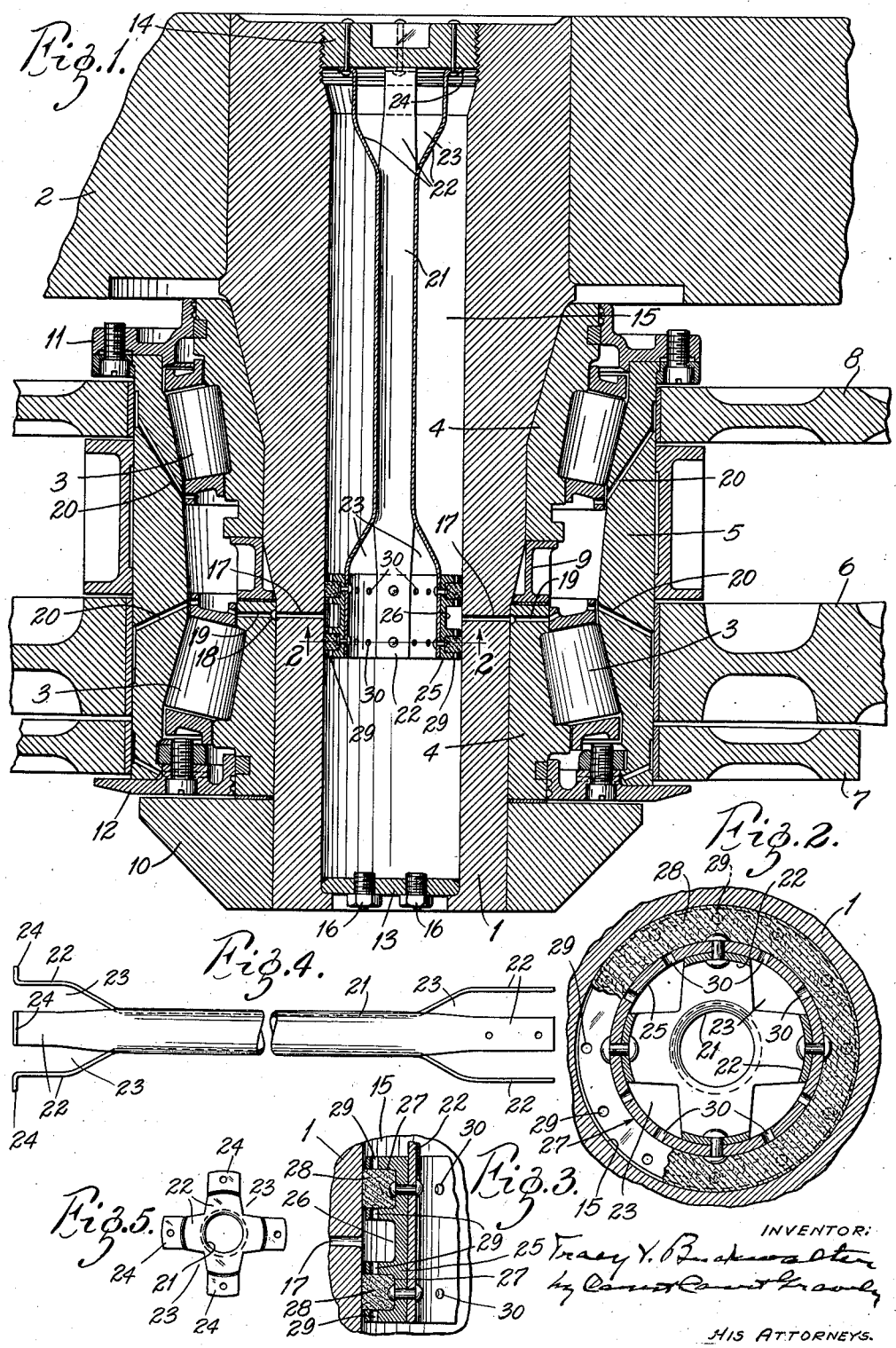

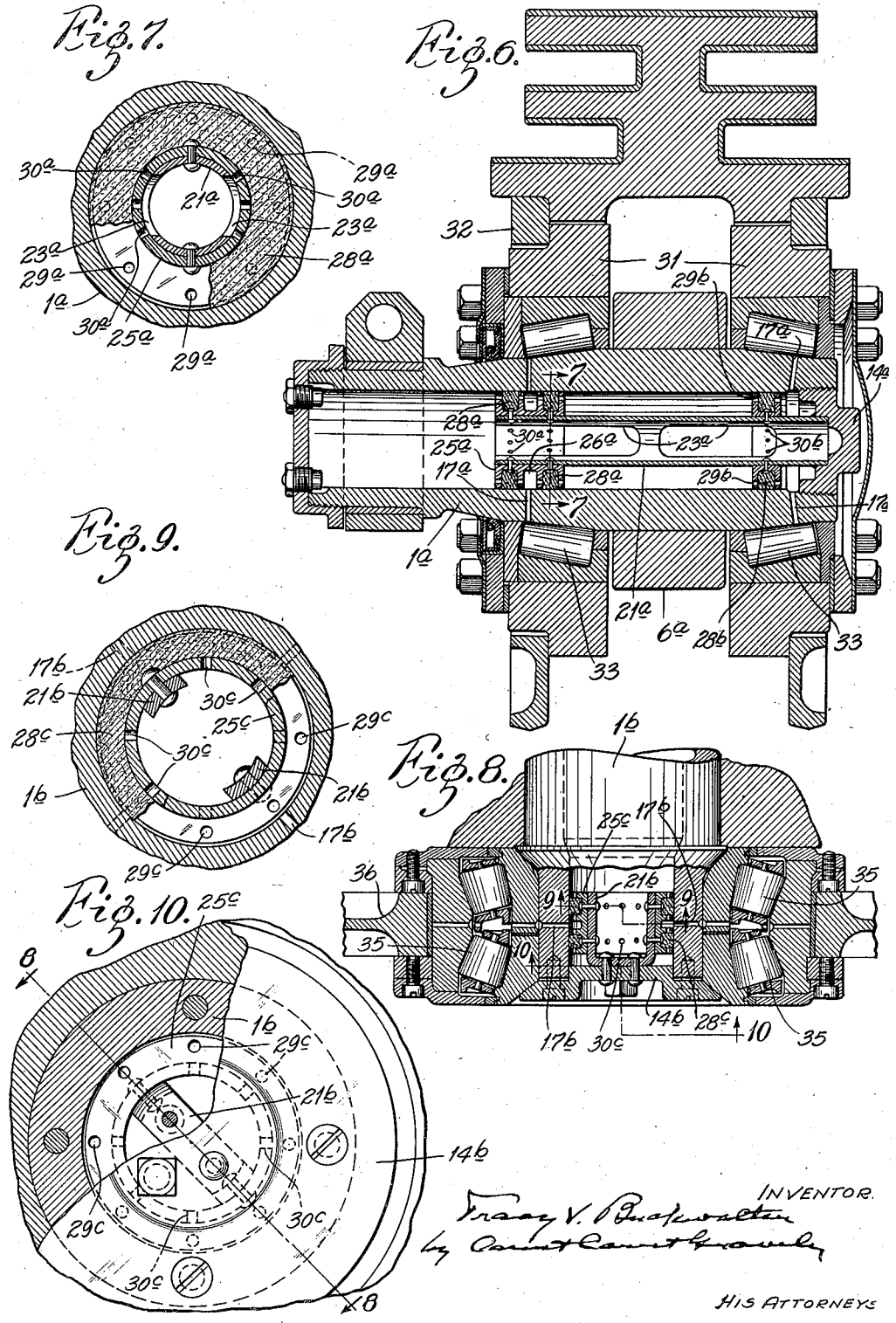

Patented May 12, 1936

2,040,803

UNITED STATES PATENT OFFICE 2,040,803

BEARING LUBRICATION

Tracy V. Buckwalter, Canton, Ohio, assignor to The Timken Roller Bearing Company, Canton, Ohio, a corporation of Ohio Application April 12, 1935, Serial No. 15,950

10 Claims. (Cl. 308—187)

This invention relates to the lubrication of bearings, particularly the bearings for shafts or pins that are made hollow to provide a reservoir for lubricant for said bearings. A practical objection to such construction is that the lubricant is fed too freely to the bearings, thereby causing excessive lubrication, considerable loss of lubricant, and necessitating frequent refilling of the reservoir. The principal object of the present invention is to overcome this objection by providing a relatively slow feed of the lubricant to the bearing. Other objects are simplicity and cheapness of construction and compactness of design. The invention consists in the lubricating bearing construction and in the combinations and arrangements of parts hereinafter described and claimed.

In the accompanying drawings, which form part of this specification and wherein like symbols refer to like parts wherever they occur.

Fig. 1 is a central horizontal section through a main crank pin bearing of a locomotive provided with a device embodying my invention for retarding the flow of lubricant from the reservoir in the crank pin to the bearings, Fig. 2 is an enlarged vertical cross-section on the line 2—2 in Fig. 1, Fig. 3 is an enlarged longitudinal fragmentary section through the main crank pin and the adjacent inner end of the oil feed tube, Fig. 4 is a side elevation of the oil feed tube without its end fittings, Fig. 5 is an end view of said tube, Fig. 6 is a central transverse section through the wrist pin of a locomotive cross-head construction provided with an oil feed mechanism embodying my invention, Fig. 7 is a cross-section on the line 7—7 in Fig. 6, Fig. 8 is a central longitudinal section through a front or rear crank pin bearing provided with an oil feeding device embodying my invention, the section being taken on the line 8—8 in Fig. 10, Fig. 9 is a vertical cross-section on the line 9—9 in Fig. 8; and Fig. 10 is a part front elevation and part cross-section on the line 10—10 in Fig. 8.

In the construction shown in Figs. 1 to 5, inclusive, of the accompanying drawings, my invention is shown in connection with a locomotive drive construction comprising a main crank pin 1 rigid with the main driver wheel 2 and provided with a suitable antifriction bearing, preferably a double, taper roller bearing comprising two series of conical rollers 3 interposed between separate cones 4 mounted on said crank pin and a doubly coned cup 5 upon which are journaled the adjacent ends of the main, intermediate and front side rods 6, 7, and 8, respectively, of the locomotive drive construction. A spacer sleeve 9 is interposed between the two bearing cones 4; and said sleeve and cones are held on the main crank pin 1 by means of a positioning and adjusting ring 10 on the outer end thereof. Mounted on the inner and outer ends of the bearing cup 5 are annular closure plates 11 and 12, respectively, that serve to hold the main, front and intermediate side rods on the bearing cup.

The main crank pin 1 is provided with an axial bore that is closed at its outer end by a plate 13 and at its inner end by a threaded plug 14 to provide a chamber or reservoir 15 that is supplied with lubricant through suitable oil feed fittings 16 mounted in the closure plate 13. The main crank pin is provided adjacent to the inner end of the outermost of the two bearing cones 4 with a plurality of radially extending lubricant passageways 17, whose outer ends communicate with an annular groove 18 around the inner periphery of said cone. Said cone is also provided with radial lubricant passageways 19 that lead from the groove 18 in the bore of the cone to the outer periphery thereof. The bearing cup 5 is also provided with radial lubricant passageways 20 leading from the interior of said cup to the outer drive rod engaging surface thereof. With this arrangement, lubricant in the chamber 15 of the hollow crank pin flows through the radial passageways 17 in said pin, thence through the radial passageways 19 in the outermost bearing cone into the annular space between the cones 4 and cup 5 and thence through the radial passageways 20 in said cup to the contacting surfaces of the cup and locomotive drive rods thereon.

In accordance with the present invention, means are provided for retarding the flow of lubricant from the reservoir 15 in the hollow crank pin 1 to the parts that are to be lubricated. Said means preferably comprise a tube 21 having its ends split and spread apart to form branches 22 with elongated openings 23 therebetween. The branches at one end of the tube terminate in outstanding flanges 24 that are bolted to the inner face of the threaded plug 14 for the inner end of the bore in the main crank pin. The branches at the other end of the tube fit within and are riveted or otherwise rigidly secured to a cylindrical sleeve 25 that is provided on its exterior surface with annular intermediate and end grooves 26 and 27, respectively. The intermediate groove 26 is located opposite to and in communication with the radial passageways 17 leading from the chamber 15 in the crank pin; and the end grooves 27 form annular seats for felt rings or washers 28 which snugly fit the crank pin chamber 15 on opposite sides of the passageways 17. The side walls of the grooves 26 and 27 are provided with series of annularly spaced holes 29 and the bottoms of the washer containing grooves 27 are provided opposite the spaces 23 between the branches 22 of the tube 21 with a series of radial holes 30 that establish communication between the interior of said tube and the bottoms of said grooves.

By the arrangement described, any lubricant leaving the chamber 15 in the main crank pin 1 through the radial passageways 17 must first pass through or around the felt washers 28 located on opposite sides of said passageways before reaching the intermediate groove 26 that directly communicates with said radial passageways. The lubricant passes around the outer peripheries of the felt rings 28 or into the grooves 27 therefor through the holes 29 and 30 and thence through and/or around said rings into the intermediate channel 26, thereby causing a relatively slow feed of the lubricant to the bearings and thus preventing excessive lubrication, waste of lubricant and requiring less frequent replenishing thereof. The device, being rigidly secured to and forming part of the threaded closure plug 14 for one end of the bore in the crank pin, may be quickly and easily inserted in and removed from said pin. The openings 23 formed between the split ends 22 of the tube 21 permit the lubricant to occupy the annular space around the tube.

In the modification shown in Figs. 6 and 7, the invention is shown in connection with the hollow lubricant containing wrist pin 1a of a locomotive crosshead construction comprising a yoke 31 pivotally supported in a slidable shoe 32, roller bearings 33 interposed between said wrist pin and the spaced branches of said yoke, and a connecting or main rod 6a supported on said wrist pin between said branches. In this construction, the lubricant in the hollow wrist pin flows to the bearings 33 through radial passageways 17a in said pin; and the bore in said wrist pin is closed at its inner end by means of a threaded plug 14a. The oil retarding device comprises a tube 21a having one end welded or otherwise rigidly secured to the threaded plug 14a and provided at its other end with a cylindrical sleeve 25a provided with felt washers 28a disposed one on each side of an annular groove 26a communicating with the radial passageway 17a leading to the outermost roller bearing. This sleeve 25a is provided with openings 29a and 30a and the tube 21a is provided with openings 23a. This arrangement operates in exactly the same manner as the arrangement hereinbefore described for retarding the flow of lubricant in the main crank pin bearings. Flow of oil through the radial passageways 17a leading to the innermost roller bearing is retarded by means of a sleeve 25b mounted on and secured to the tube 21a and provided with an annular groove adapted to receive a felt washer 28b. The washer 28b is located between the passageway 17a for the inner bearing and the lubricant retarding washers for the outer bearing and the groove for the single washer 28b is provided with openings 29b and 30b in its sides and bottom for permitting the flow of the lubricant into and out of said groove.

Figs. 8, 9 and 10 show a front or rear crank pin 1b provided with means for retarding the flow of lubricant to the passageways 17b leading from the reservoir of said pin to the bearings 35 interposed between said pin and the locomotive side rod 36. The lubricant retarding device comprises a member 21b rigidly secured to the closure plate 14b for the front end of the bore in the crank pin and having spaced branches extending within and riveted or otherwise secured to a sleeve 25c. The sleeve 25c is provided on its exterior surface with felt rings 28c that fit the bore of said pin on opposite sides of the radial passageways 17b. The annular washer receiving grooves are provided with side and bottom openings 29c and 30c, respectively, so that the lubricant may flow into and out of said grooves. With this arrangement, the lubricant must pass through and/or around the felt rings before it reaches the groove therebetween that communicates with the radial passageways 17b, thereby providing a relatively slow feed of the lubricant to the bearings 35.

While the hereinbefore described invention is particularly applicable to the lubrication of bearings for the pins for supporting locomotive drive rods, it is also applicable to other bearing constructions wherein the lubricant feed is quite rapid due to rotary or transverse movement of the lubricant containing shaft or pin.

What I claim is:

1. An antifriction bearing, a shaft therein provided with a reservoir for lubricant and a series of circumferentially spaced passageways leading from said reservoir to said bearing, and means in said reservoir for retarding the flow of lubricant therein to said passageways, said means comprising a sleeve removably mounted in said reservoir opposite said passageways, and a ring of porous material mounted on and removable with said sleeve and filling the space between said sleeve and the wall of said reservoir adjacent but entirely to one side of said series of passageways.

2. An antifriction bearing, a shaft therein provided with a lubricant containing reservoir and passageways, leading from said reservoir to said bearing, and means in said reservoir for retarding the flow of the lubricant therein to said passageways, said means comprising a sleeve mounted in said reservoir opposite said passageways, and a ring of porous material in the space between said sleeve and the wall of said reservoir on at least one side and entirely clear of said passageways.

3. An antifriction bearing, a shaft therein provided with a reservoir for lubricant and a series of circumferentially spaced passageways leading from said reservoir to said bearing, and means in said reservoir for retarding the flow of lubricant therein to said passageways, said means comprising a sleeve mounted in said reservoir opposite said passageways, and axially spaced rings pervious to the lubricant filling the space between said sleeve and the wall of said reservoir on opposite sides of said passageways, the space between said axially spaced rings being located opposite to and in direct communication with said passageways.

4. An antifriction bearing, a shaft therein provided with a lubricant containing reservoir and a series of circumferentially spaced passageways leading from said reservoir to said bearing, and means in said reservoir for retarding the flow of the lubricant therein to said passageways, said means comprising a closure for an opening in said reservoir, a member rigid with said closure and extending into said reservoir, and axially spaced rings of porous material interposed between said tubular member and the wall of said reservoir on opposite sides of said passageways.

5. An antifriction bearing, a shaft therein provided with a lubricant containing reservoir and a series of circumferentially spaced passageways leading from said reservoir to said bearing, and means in said reservoir for retarding the flow of the lubricant therein to said passageways, said means comprising a closure for an opening in said reservoir, a member rigid with said closure and extending into said reservoir, a sleeve mounted on said member, and axially spaced rings of porous material mounted on said sleeve and engaging the wall of said reservoir on opposite sides of said passageways.

6. An antifriction bearing, a shaft therein provided with a lubricant containing reservoir and a series of circumferentially spaced passageways leading from said reservoir to said bearing, and means in said reservoir for retarding the flow of the lubricant therein to said passageways, said means comprising a plug for closing an opening in said reservoir on one end of said shaft, a tubular member rigid with said plug and extending into said reservoir axially of said shaft, and axially spaced rings of porous material interposed between said tubular member and the wall of said reservoir on opposite sides of said passageways.

7. An antifriction bearing, a shaft therein provided with a lubricant containing reservoir and passageways leading from said reservoir to said bearing, and means in said reservoir for retarding the flow of the lubricant therein to said passageways, said means comprising a plug for closing an opening in said reservoir, a tube having one end rigid with said plug, a sleeve mounted on said tube and provided on its exterior surface with annular end and intermediate grooves, the intermediate groove being in communication with said passageways, and rings of porous material mounted in the annular end grooves in said sleeve in contact with the wall of said reservoir.

8. An antifriction bearing, a shaft therein provided with a lubricant containing reservoir and passageways leading from said reservoir to said bearing, and means in said reservoir for retarding the flow of the lubricant therein to said passageways, said means comprising a plug for closing an opening in said reservoir, a tube having one end rigid with said plug, a sleeve mounted on said tube and provided on its exterior surface with annular end and intermediate grooves, the intermediate groove being in communication with said passageways, and rings of porous material mounted in the annular end grooves in said sleeve in contact with the wall of said reservoir, the sleeve engaging portion of said tube having openings therein and said sleeve having openings therein leading from the openings in said tube to the bottoms of the ring receiving grooves.

9. An antifriction bearing, a shaft therein provided with a lubricant containing reservoir and passageways leading from said reservoir to said bearing, and means in said reservoir for retarding the flow of the lubricant therein to said passageways, said means comprising a plug for closing an opening in said reservoir, a tube having longitudinally slit and expanded end portions, one of said end portions being rigid with said plug, a sleeve mounted on the other end portion of said tube and provided on its exterior surface with annular end and intermediate grooves, the intermediate groove being disposed opposite said passageways, and rings of porous material in the annular end grooves of said sleeve in contact with the wall of said reservoir.

10. An antifriction bearing, a shaft therein provided with a lubricant containing reservoir and passageways leading from said reservoir to said bearing, and means in said reservoir for retarding the flow of the lubricant therein to said passageways, said means comprising a plug for closing an opening in said reservoir, a tube having longitudinally slit and expanded end portions, one of said end portions being rigid with said plug, a sleeve mounted on the other end portion of said tube and provided on its exterior surface with annular end and intermediate grooves, the intermediate groove being disposed opposite said passageways, and rings of porous material in the annular end grooves of said sleeve in contact with the wall of said reservoir, the side walls of said end grooves being provided with openings in communication with the reservoir and the intermediate groove, and the bottoms of said end grooves being provided with openings communicating with the interior of said tube.

TRACY V. BUCKWALTER.